Feb. 12, 1924.
C. GITZENDANNER
STRUT ROD
Filed Aug. 18, 1921
1,483,342
2 Sheets-Sheet 1
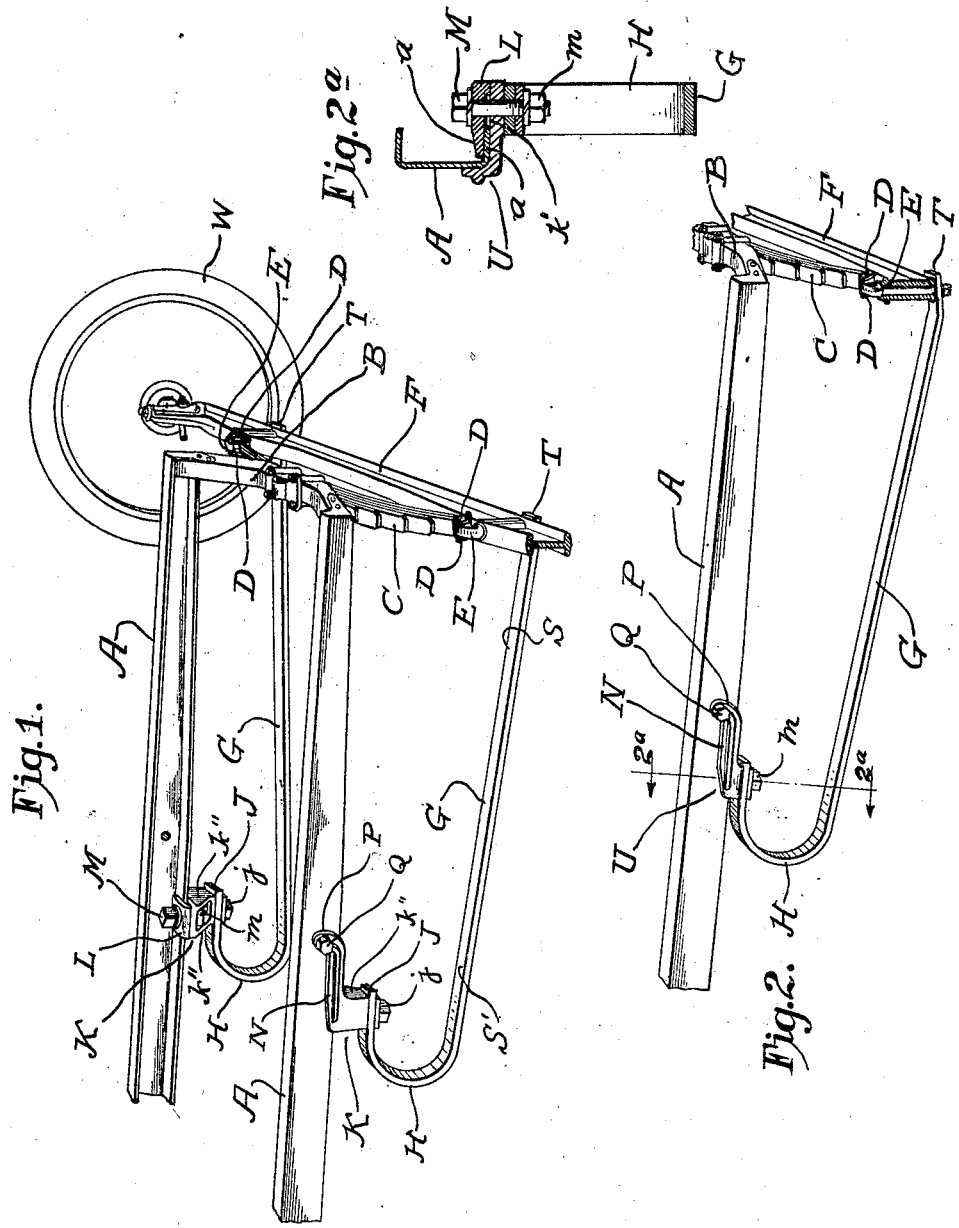
Witnesses:
H. Muchmore
J. H. Curtz
INVENTOR.
CHARLES GITZENDANNER
BY
his ATTORNEY Feb. 12, 1924. 1,483,342
C. GITZENDANNER
STRUT ROD
Filed Aug. 18, 1921 2 Sheets-Sheet 2
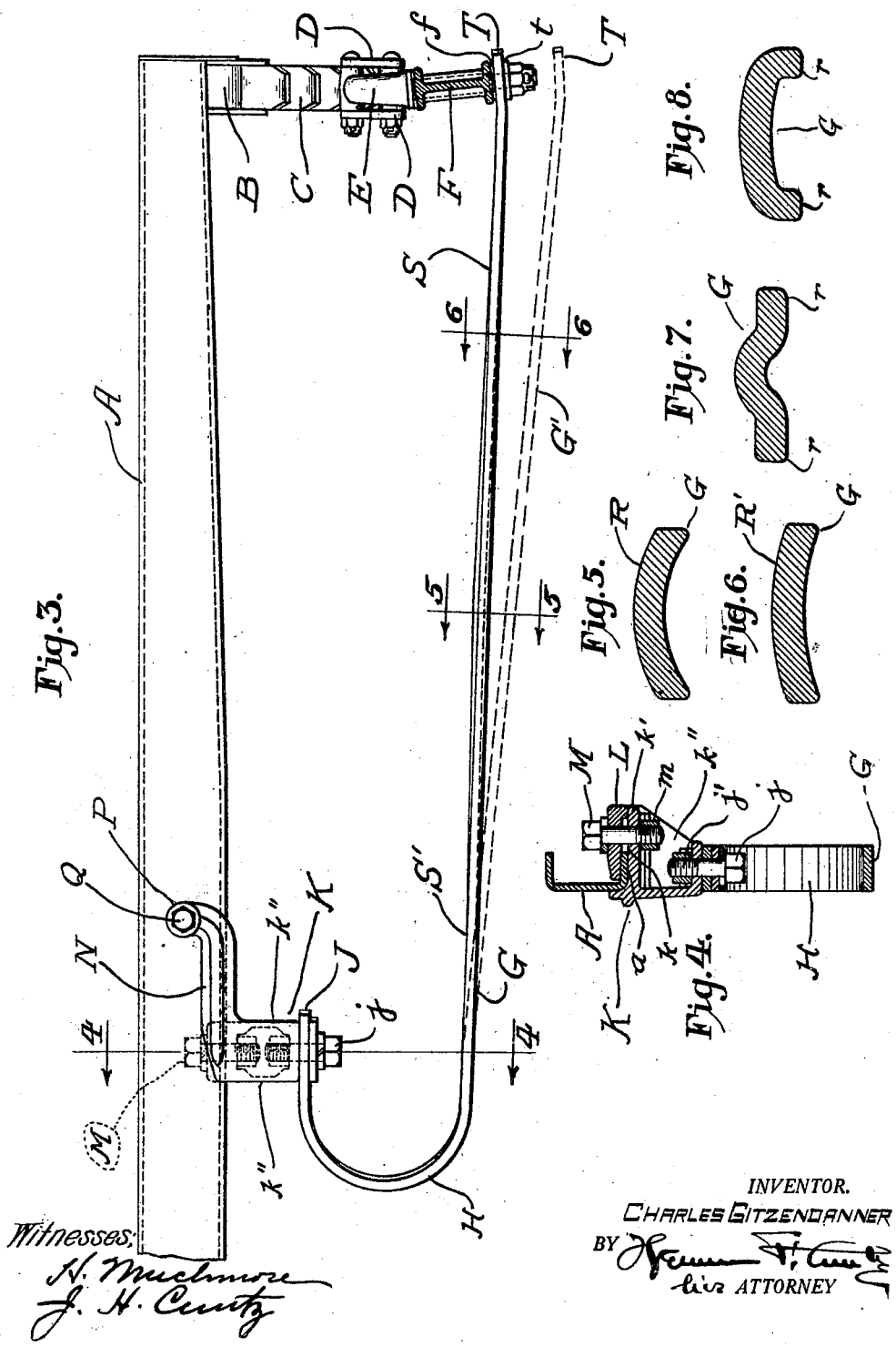
INVENTOR.
CHARLES GITZENDANNER
BY 
his ATTORNEY Patented Feb. 12, 1924.

1,483,342

UNITED STATES PATENT OFFICE.

CHARLES GITZENDANNER, OF RIDGEWOOD, NEW YORK.

STRUT ROD.

Application filed August 18, 1921. Serial No. 493,386.

*To all whom it may concern:*

Be it known that I, CHARLES GITZEN-DANNER, a citizen of the United States, residing in the town of Ridgewood, borough of Brooklyn, county of Queens, State of New York, have invented certain new and useful Improvements in Strut Rods, of which the following is a specification, reference being had to the accompanying drawings, illustrative of one particular embodiment of my invention.

This invention relates to the part of a vehicle which serves the purpose of maintaining the predetermined horizontal position of axle with respect to the frame or body, the part being usually referred to as the strut rod. Such member serves to connect and carry the strain due to relative motion of axle and body or frame, and still permit relative vertical movement of the axle with relation to the frame or vice versa. On account of this relative movement, involving a limited motion of the axle point of attachment of the member with relation to the point at which the member is attached to the frame, it is some times called a radius rod or radius bar. Such strut or radius rods or bars have heretofore been attached at their ends in a manner permitting the limited but necessary oscillation or swinging by means of loose joints at one or both ends, as, for example, ball and socket joints or a double plain joint, and in some structures the joint attachment has involved a limited spring compression feature, but otherwise the strut bars are substantially horizontal and rigid except for some bearing joint, usually a ball and socket joint.

By the practice of my invention the loose or yielding joints at the points of attachment of the radius bar may be entirely eliminated, thereby eliminating the necessity of lubrication of any joints, and also eliminating the factor of a moving part or parts liable to wear and liable to loosening and detachment or breakage.

Besides a fixed attachment giving rigidity to the connection of my radius bar or strut bar, with the axle at one end and the frame or body at the other end, the inherent nature of the main portion of the bar is peculiarly adapted to withstand all vertical strains, there being a yield in a curved portion of the bar to accommodate transverse strains and at the same time the form of bar admirably accommodates any transverse horizontal stress.

For frequent vertical vibration, the main length of a radius bar is subjected to alternate strains producing what is called whipping, which it is desired to offset or prevent in order to make the strut rod durable; and to make it the most serviceable the place and method of attachment to the front axle is important as hereinafter set forth; and the cooperation of spring tension of the strut rod with respect to the other connection between the front axle and frame of a vehicle leads to advantages of importance more specifically set forth hereafter.

The form and general characteristics of this invention are referred to in United States Letters Patent No. 1,360,925, granted November 30, 1920, with respect to which my present inventions are further developments.

In general, this is accomplished by the forming of a substantially straight bar of relatively small depth compared with breadth and curving at one end, with a suitable curvature well within the limits of conditions that would concentrate strains for crystallization of the metal or surface tension fracture of the metal, and having both ends of the bar in such condition as to afford a clamping attachment with the avoidance of concentrated strains which would cause fracture at the connections if not properly arranged.

One embodiment of my invention I have shown in the accompanying drawings, in which:

Fig. 1 is a perspective view of the front end of a chassis frame and axle with the strut rods in position.

Fig. 2 is a fragmentary view in perspective of the front corner of chassis frame and axle showing modified form of attachment of the radius bar to the frame. Fig. 2$^a$ is a vertical section on line 2$^a$—2$^a$ of Fig. 2.

Fig. 3 is a side elevation in large scale of one strut bar and its means of attachment to a front axle and frame member.

Fig. 4 is a vertical section on line 4—4 of Fig. 3.

Fig. 5 is a transverse section of the strut bar at line 5—5 Fig. 3.

Fig. 6 is a transverse section of a strut rod on line 6—6 Fig. 3.

Fig. 7 is a modified form of cross-section of the main portion of a strut bar.

Fig. 8 is a cross-section of a modified form of strut rod.

The main frame members A are the side frame or sill members as usual in an automobile, B is the transverse front frame member or yoke forming a support for the front transverse body spring C, connected by shackles D—D to spring perches E—E, connected with or formed on the axle F.

The strut rod consists primarily of the main member G, which at one end merges into a curved portion H and a return curved portion J clamped to a bracket K, which bracket fits the lower flange a of the sill A. A clamp L serves to cooperate with the upper face k of the bracket K, and by bolt M with nut m secures the bracket tight to the sill, while an ear N integral with the bracket K steadies the bracket with the end of the ear P held secure by a bolt Q clamping through the web of the frame member or sill A. The lower side of the bracket has a bolt j with a nut j' serving to clamp the end J of the main strut member into rigid engagement. On one side of the bracket K a wall k' provides the structural strength forming a box section with the two walls k''—k'' between which the inner side is open to permit the insertion of nuts j' and m, which are preferably square nuts held between shoulders in the top and bottom of the bracket cavity, so that the nuts will not turn, and thereby assuring facility in assembling the parts and setting up the bolts j and M.

The main portion G of the strut is crimped or slightly curved as shown in section 5, preferably with an upward curved medial area R tapering from a maximum, to a flat section at the forward end S, and at the rear S', the taper being shown by the section taken part way, at which point, 6—6, the convex crimp R' is less than the maximum. The member G may be rolled or otherwise crimped as shown in Fig. 7, or as shown in Fig. 8, where the edges r are turned down to form flanges. By crimping or forming the long section G of the strut in this fashion, transverse stiffness is given to resist whipping, or conversely a greater transverse strength is obtained with a reduced weight of metal, and in addition the long section so formed provides for greater strength as a strut to resist compression strains by shock or impact at one end of the strut.

Preferably formed normally to take the position G' shown in dotted lines, in Fig. 3, when attaching the strut rod the main member must be forced slightly upward so that when attached there is a normal spring tendency to force the axle F away from the sill A, and with one strut rod at either side the tendency is to distend the transverse body spring C, or have the general effect of forcing axle F, and thereby the wheel W, and the other wheel, not shown in the drawing, relatively downward from the front sill position so that there is a constant tendency to hold the front wheels of the car on the road and dampen their vertical vibration, and consequently prevent or eliminate vibration that otherwise would be felt except for the characteristics of the strut rod herein described.

The frame end of the strut rod part G is attached to the lower end of the shank of the spring perch E with an intervening washer or plate T, and is bent to engage the flat seat f on the lower face of the axle, thereby providing a rigid connection to advantageously transmit all strains of the axle to the strut rod without localizing strains in the connection to the detriment of the structure. By securing the forward end of the strut rod to the bottom of the axle, and providing the curvature at H of the rear section of the strut rod to suit the particular dimensions of the vehicle for which it is intended, the position of the main portion G of the strut rod becomes close to horizontal, and with the yield of the spring portion between S' and the curved portion H, ample flexibility for vertical relative movement of the front axle F is accommodated without any material or objectionable horizontal displacement of the front axle during the relative movement of the main members. The initial tension downward of the front end T of the strut can be so proportioned that it will have a greater tendency to spring the front axle away from the forward end of the frame, than the transverse spring C. This front transverse spring essentially provides for the load or weight carrying and its characteristics are therefore distinctly different from the spring in the strut, and for the latter the factors of curvature H and the strength and spring in the section from S' to the curved portion H are so designed that the struts on either side will tend to uniformly hold the front axle, so-to-speak, to the ground and thereby materially improve the traction of the front wheels in all conditions of driving, while still permitting all necessary freedom of articulation of the front axle to accommodate inequalities in the road.

As shown in Figs. 2 and 2ª, the bolt M and nut m serve the double purpose of clamping the plate or clamp L and the modified bracket U to the lower flange a, and to hold the end J of the main member of the strut by the one operation and by the one bolt member, in rigid connection when the strut is assembled on the car. In this modified bracket form U the extension N, with its ear Q, is firmly clamped to the sill A, while the base k' forming the seat for the lower sill flange engagement, may be extended forward or backward, or both, so as to form a longer engagement with the bottom flange of the sill, and additional clamps may be used so that a firm base connection to the flange is obtained over a larger area, in cases where the strains involved are deemed to require such additional securities in attachment.

It will thus be seen that in the invention herein set forth, a strut rod securely fastened at either end without loose parts, is provided with an intermediate main portion in which self-contained spring yield accommodates relative vertical movement of the front axle, while a portion of the main strut member is fashioned to provide greater strength as a strut with relatively lighter weight for horizontal shock, and a self-yielding or cushioning spring portion provides for the absorption of excessive shocks on the axle in a horizontal direction, while providing, nevertheless, sufficient strength and rigidity to maintain the front axle in its predetermined horizontal position relative to the frame under all ordinary conditions of use. It will be noted that the front axle with its rolling wheels normally has little horizontal strain or shock, whereas the abnormal shock due to encountering a large obstruction or obstruction unsurmountable to the wheel, is not alone an abnormal shock but it is a momentary shock,—and the yielding of the portion H of the main strut member provides the cushioning or the slight yield necessary to absorb that abnormal and momentary shock or strain which is thereby truly absorbed and dissipated, and thereby prevents the full initial shock from carrying through the structure of the vehicle to any rigid part and causing the fracture of parts which the entire initial shock would cause. By the forming of the main and the longest portion of the strut in a manner to resist a strain in the direction of its axis, all of the severe conditions of service are met, including the whipping effect where the exceptional vibration might cause a lateral accumulation of synchronous strains that otherwise might accumulate beyond the strength of the material for transverse resistance.

It will also be noted that the two struts G—G, as shown in Fig. 1, diverge from their frame sill attachment to points on the axle further apart, so that in conjunction with the connections of the front transverse body spring C an interconnection of members provides most advantageously for the preservation of the front axle in its original and initial position of parallelism with the rear axle, with a constant tendency to maintain the true alignment of the front axle, which in turn minimizes or eliminates the strains that otherwise a free movement of the front axle would cause to be thrown onto the steering connections and thereby indirectly cause damage or wear, which is avoided by the use of my invention.

The features of construction of the brackets either in the main form or in the modified form serve for facility in production and simplicity in attachment and throughout durability in use.

While various modifications may be made with respect to material and details of construction, without departing from the spirit of my invention,—what I claim and desire to secure by Letters Patent is:

1. A radius bar for automobiles or like vehicles, comprising a bar or leaf substantially straight throughout its length, flat end portions on the straight section and an intermediate crimped or flanged portion, a return curved section contiguous with one end portion of the main section, and means for rigid attachment of the radius bar at either end respectively to the relatively moving parts of the vehicle.

2. In an automobile, a main frame member, an axle, a spring supporting the weight of the main frame upon the axle in a line substantially parallel with the axle, two strut bars with one end fixedly secured to the frame member remote from the axle and each having the other end rigidly attached to the axle respectively near opposite ends, an integral spring portion in each strut having an initial spring set whereby both struts tend to simultaneously draw the axle ends normally away from the main frame member.

3. In an automobile, a main frame member, an axle, a transverse weight-supporting spring above said axle, a strut having an integral spring portion and means for rigid clamping to the frame at a point remote and to the rear of the transverse body spring, means for rigid attachment to the bottom of the axle at the forward end of the strut, a stiff section of said strut formed by crimping or flanging part of the straight section and a curved spring portion integrally merging into the same.

4. A strut rod comprising a flat spring metal member, a curved section near one end thereof terminating in a reverse flat end and a flat section at the opposite end, an intermediate straight portion having the flat form partially flanged or crimped to form a buckling resisting portion, and means for rigid attachment at each end respectively to relatively moving parts of a vehicle.

5. In an automobile, a main frame, side sills, a transverse front member, a front axle, a weight-carrying spring substantially in the plane of the axle with one central point of support and two end points of support, two strut rods with self-contained integral spring sections, means for rigid attachment of one end of each strut to one of the main sill members and means for attachment of the other ends of the struts to near opposite ends of the axle with a spring set under normal load conditions tending to spread the axle from the two main frame points of support away from the single point of support of the load-carrying spring.

6. In an automobile or like vehicle, two self-contained spring struts each having a rigid point of support on a main frame member equally remote from an axle, an axle, a load-carrying spring having an effective third point of suspension with the main frame of the vehicle substantially in the vertical plane of the axle, rigid means of attachment of the frame end of the spring struts to the axle at points more widely separated than the attachment at the other ends of the strut to the frame, whereby both struts tend simultaneously to draw the axle ends normally away from the main frame member.

In testimony whereof, I have signed my name to this application, in the presence of two subscribing witnesses, this 16th day of August 1921.

CHARLES GITZENDANNER

Witnesses:
JAMES M. CARPLES,
HERMANN F. CUNTZ.